UNITED STATES PATENT OFFICE.

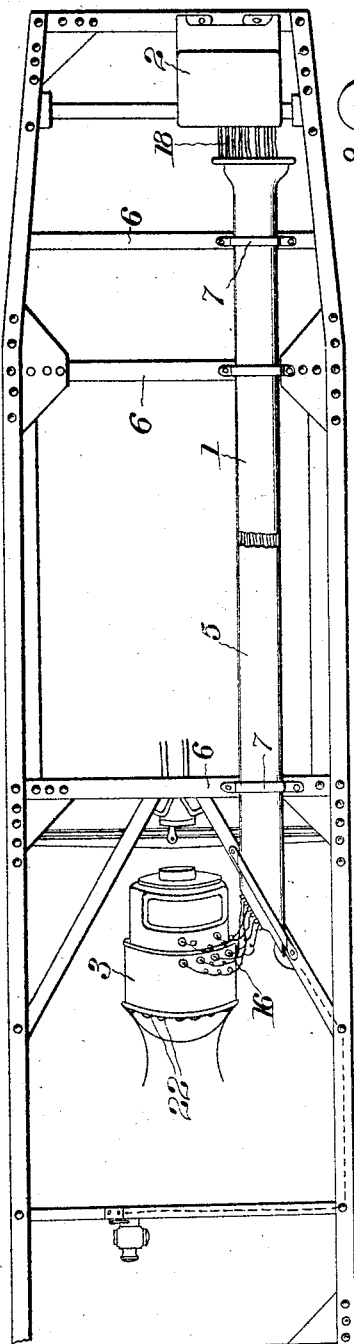

WILLIAM MacGLASHAN, OF SOUTH BEND, INDIANA, ASSIGNOR TO THE STUDEBAKER CORPORATION, OF SOUTH BEND, INDIANA, A CORPORATION OF NEW JERSEY.

CIRCUIT PLAN AND CONDUIT FOR MOTOR-VEHICLES.

1,181,151.                    Specification of Letters Patent.        Patented May 2, 1916.

Application filed February 5, 1913. Serial No. 746,326.

*To all whom it may concern:*

Be it known that I, WILLIAM MAC-GLASHAN, a citizen of the United States of America, residing at South Bend, St. Joseph county, State of Indiana, have invented certain new and useful Improvements in Circuit Plans and Conduits for Motor-Vehicles, of which the following is a specification.

This invention relates to the arrangement of and means for protecting and housing the circuit in an electrically driven motor vehicle.

In such vehicles the motor and the controller are connected by a series of wires, and the wires connecting the controller and motor ordinarily form a cable extending from the front to the rear of the machine. If for any reason which is not understood the machine will not operate, the circuit must be examined. With the present machines to make a thorough examination of the circuit is an exceedingly difficult matter, as the cable must be withdrawn and each wire inspected. It sometimes happens that one or more wires will become broken within the cable. To locate such troubles is exceedingly difficult. It is also inconvenient to disconnect the motor or controller when so connected. They are thus rendered difficult to remove for repair or to replace. The circuit and conduit herein described have been provided with a view to facilitating the examination of the circuit and making the motor and controller easy to disconnect, remove and replace.

To this end a single conduit is provided in which all the wires are placed so that they are conveniently accessible. The conduit has removable covering means extending its full length so that when open it exposes the entire circuit, and the wires are separate instead of being bound in the form of a cable.

The conduit extends from a point adjacent the controller to a point on the frame adjacent the motor. At each end of the conduit terminals corresponding to the coils in the motor are mounted. Within the conduit is a corresponding number of insulated wires or conductors connecting the terminals, and the outer end of each terminal serves as a binding post to which the corresponding motor wires may be attached at one end of the conduit and the controller wires at the other end. Also the battery wire and the wires for lighting at the rear of the vehicle are conveniently placed within the conduit. Thus, if it is desired to disconnect the motor or controller for the purpose of removing either, this may be done without otherwise disturbing the circuit by merely disconnecting the wires at the binding posts.

The conduit itself is preferably formed of interlocking sections, *i. e.*, of two channels one of which closes over the other, and the top channel is held in position by means of U-shaped bands which may be screwed or otherwise fastened in position. If anything goes wrong with the circuit, the cover may be removed from the conduit and the connections thoroughly examined.

The accompanying drawings include a portion of a vehicle to which the device of the invention has been applied, together with fragmentary illustrations of the circuit and connections.

Figure 1 is a plan of the vehicle frame indicating a motor, a controller, connecting wires and a conduit inclosing the wires. Fig. 2 is a plan of the conduit with the wires therein, the cover being removed and the conduit and wires cut away centrally to shorten the structure for purposes of illustration. Fig. 3 is a vertical, central cross-section through the conduit.

Referring to the drawings by numerals, the conduit is shown at 1 extending from a point adjacent the controller 2, backward to a point near the motor 3. As illustrated, the conduit consists of a bottom channel 4 and a top channel 5 interlocking at their edges the top channel being externally placed. The conduit in its preferred form is flat or elongated in a horizontal plane as to its cross-section, is supported on the cross-bars 6 of the frame as shown in Fig. 1, and is held in position by means of U-shaped bands 7. At each end the conduit is closed by means of a block of insulating material 8 at the rear end and 9 at the forward end, and each block is pierced with apertures 10 corresponding in number to the coils, the number being increased by the connections necessary for lights, etc. Extending through each aperture 10 is a terminal 11 having a socket 12 on the end disposed toward the interior of the conduit and a flattened head 13 at the same end. At its opposite end this terminal member is threaded to receive nuts 14 forming a binding post. Within the conduit are insulated wires or connecting members 15 extending from one end to the other, and having their front and rear ends thrust into the corresponding sockets 13 in the terminals. At the rear end, the motor wires 16 extending out through the casing, are provided each with a loop 17 adapted to be passed over the outer ends of a terminal 11 and held between the nuts 14 on the shank of the terminal, so that each wire 16 is connected to one of the terminals 11. At the front the corresponding controller wires 18 are likewise formed and connected to the terminals 19 which are similar to the terminals 11 in a like manner.

As shown, the conduit 1 also carries the wire 20 for the lights at the rear and the battery wire 21. It will be apparent that when the motor, which is made conveniently detachable by removing the bolts 22, is removed, or for any other reason it is found desirable, the wiring may be conveniently disconnected at the terminals 11 and that the controller may be likewise disconnected at the posts 19, and that the wires 15 in the conduit are conveniently accessible by removing the top channel 5 so that the entire circuit is instantly open to minute inspection, and any defect in the operation of the circuit which arises may be easily run down on account of the convenience with which the circuit may be inspected. Also the wires are efficiently protected by the conduit which, placed centrally of the body of the vehicle and the chance of injury to the connections is reduced to the minimum.

I have thus described specifically a preferred form of my invention in order that its nature and operation may be clearly understood.

The essential features which I desire to claim are:

1. A conduit for motor vehicles embodying a longitudinally divided, elongated housing, insulating partitions extending across and closing each end of the housing, complementary terminal posts fixed in the oppositely positioned partitions, and wires connecting each complementary pair of posts, said partitions being fixedly secured to one of the sections of the divided housing and the other section being unattached and removable at will to allow of free access to the wires positioned interiorly of the housing, in combination with means for normally maintaining the sections of the housing in assembled relation.

2. A conduit for motor vehicles embodying a longitudinally divided, elongated housing, insulating partitions seated in and closing the opposite ends of the housing, one of which partitions is positioned obliquely to the longitudinal axis of the housing, complementary terminal posts fixed in the oppositely positioned partitions, and wires connecting each complementary pair of posts, said partitions being fixedly secured to one of the sections of the divided housing and the other section being unattached and removable at will to allow of free access to the wires positioned interiorly of the housing, in combination with means for normally maintaining the sections of the housing in assembled relation.

Signed by me at South Bend, Indiana, this 28" day of January, 1913.

WILLIAM MacGLASHAN.